(12) United States Patent
Vandriel

(10) Patent No.: US 11,772,249 B2
(45) Date of Patent: Oct. 3, 2023

(54) SERPENTINE BELT TENSIONER COMPRESSOR TOOL

(71) Applicant: Edwin Peter Vandriel, Moorefield (CA)

(72) Inventor: Edwin Peter Vandriel, Moorefield (CA)

( * ) Notice: Subject to any disclaimer, the term of this patent is extended or adjusted under 35 U.S.C. 154(b) by 259 days.

(21) Appl. No.: 17/381,252

(22) Filed: Jul. 21, 2021

(65) Prior Publication Data

US 2023/0024963 A1    Jan. 26, 2023

(51) Int. Cl.
*B25B 27/30* (2006.01)
*F16H 7/12* (2006.01)
*F16H 7/08* (2006.01)

(52) U.S. Cl.
CPC ............. *B25B 27/304* (2013.01); *F16H 7/12* (2013.01); *F16H 2007/0806* (2013.01); *F16H 2007/088* (2013.01)

(58) Field of Classification Search
CPC ....... F16H 7/1263; F16H 7/24; B25B 27/304; B25B 27/306; B25B 27/0035; B25B 5/102; Y10T 29/53848; Y10T 29/53852
See application file for complete search history.

(56) References Cited

U.S. PATENT DOCUMENTS

| | | | |
|---|---|---|---|
| 3,641,830 A | 2/1972 | Stofer | |
| 4,017,059 A * | 4/1977 | Laine | F16H 7/1263 254/231 |
| 4,557,709 A | 12/1985 | St. John | |
| 5,277,666 A | 1/1994 | Kumm | |
| 5,354,242 A | 10/1994 | St. John | |
| 5,370,586 A | 12/1994 | Thomsen et al. | |
| 6,161,817 A | 12/2000 | Lee | |
| 6,398,681 B1 * | 6/2002 | Wanie | F16H 7/1263 474/101 |
| 8,888,625 B2 | 11/2014 | Lehman et al. | |
| 9,806,583 B2 | 10/2017 | Norris et al. | |
| 2006/0021481 A1 | 2/2006 | Sluzalis et al. | |
| 2009/0062046 A1 | 3/2009 | Lindemann | |

* cited by examiner

*Primary Examiner* — Tyrone V Hall, Jr.
(74) *Attorney, Agent, or Firm* — Argus Intellectual Enterprise; Jordan Sworen; Daniel Enea

(57) ABSTRACT

A spring compressor tool is provided. A tool for compressing an inline spring-loaded serpentine belt tensioner used in motive power systems, comprising a frame affixed with a fastening pin, the fastening pin optionally inserted into a hollow axle of the inline spring-loaded serpentine belt tensioner. A threaded stud affixed to an end of the frame, the threaded stud optionally coupled to a yoke providing lateral movement of the yoke along the threaded stud. A threaded fastener optionally coupled to the threaded stud and the yoke restricting movement of the yoke, the yoke optionally coupled to an end of the inline spring-loaded serpentine belt tensioner opposite the fastening pin. A lip attached to the yoke, the lip grasping the end of the inline spring-loaded serpentine belt tensioner, movement of the yoke along the threaded stud controls extension and contraction of the inline spring-loaded serpentine belt tensioner.

3 Claims, 5 Drawing Sheets

SERPENTINE BELT TENSIONER COMPRESSOR TOOL

FIELD OF THE INVENTION

The present disclosure relates to a spring compressor tool more specifically, but not by way of limitation, more particularly to a tool to compress inline spring-loaded serpentine belt tensioners in motive power systems.

BACKGROUND

Any discussion of the related art throughout the specification should in no way be considered as an admission that such related art is widely known or forms part of common general knowledge in the field.

Modern diesel and internal combustion engines typically include closed loop belts which have a serpentine shape inasmuch as they fit around and connect a plurality of pulleys associated with various operating components or elements of the engine. Drive belts are commonly used to support a drive motor coupled to an accessory, such as a heating, ventilation, and air conditioning (HVAC) unit, among others. Often, a tensioner maintains a constant tension on the belt to insure proper operation of the various driven devices. When seeking to repair or replace a component of an engine associated with a serpentine belt driven pulley, or when seeking to replace a serpentine belt, it is necessary to release the tension on the belt.

Currently there exists no tool on the market to compress an inline spring-loaded serpentine belt tensioner to release tension on a serpentine belt. A common technique for a person who must perform work on this system, often used by mechanics for example, is to cut the serpentine belt and replace the tensioner each time because there is no tool to safely compress and/or extend an inline spring-loaded tensioner. Another option is to perform dangerous repair techniques, with no guarantee for success.

U.S. Pub. No. 2009/0062046 A1 (Lindemann) discloses a belt tensioner with an adjustable slider plate and replaceable pulley. Shortcomings include a lack of adaptability, where this device is itself the tensioner, and cannot be used alongside another inline tensioner. Further shortcomings include a lack of direction with respect to compressing the spring of the tensioner for reusing the same tensioner and spring after working on the belt system.

U.S. Pub. No. 2006/0021481 A1 (Sluzalis et al.) discloses a serpentine belt tool for releasing tension upon a serpentine belt tensioned by a biased idler pulley. Shortcomings include that this tool is directed towards removing tension from an idler pulley, and not from the tensioner spring providing the belt tension.

U.S. Pat. No. 9,806,583 B2 (Norris et al.) discloses a quick-release automatic tensioning motor base and spring compression retention mechanism. Shortcomings include a lack of direction towards tensioners and does not discuss removing tension from a belt drive to perform maintenance, while still being able to reapply tension afterwards.

U.S. Pat. No. 8,888,625 B2 (Lehman et al.) discloses a quick release tensioner system for adjusting the position of an idler to tension loops, such as belts and chains. Shortcomings include a lack of adaptability, where this device is itself the tensioner, and cannot be used alongside another inline tensioner. Further shortcomings include that this tensioner system is directed towards rotary tensioner systems, rather than inline tensioners.

U.S. Pat. No. 6,161,817 A (Lee) discloses a tool for releasing serpentine belt tension in automobiles. Shortcomings include the burdensome manual labor required to release belt tension, which may be dangerous. Further shortcomings include the inability to affix the tool within a drive belt system, for use whenever tension or compression may be required. There is also a lack of discussion surrounding how a spring tensioner may be affected and does not discuss compressing the tensioner itself to reduce tension on a belt drive.

U.S. Pat. No. 5,370,586 A (Thomsen et al.) discloses a belt tensioning apparatus for maintaining the tension in the belt of a serpentine belt drive system. Shortcomings include a lack of adaptability, where this device is itself the tensioner and cannot be used alongside another inline tensioner. Further, there is a lack of discussion regarding the complete removal of tension from a belt drive to perform maintenance, while still being able to reapply tension afterwards, instead this prior art is directed towards maintaining an ideal system tension.

U.S. Pat. No. 5,354,242 A (St. John) discloses a belt tensioning system for maintaining consistent and constant tension in a serpentine drive system. Shortcomings include a lack of discussion regarding the complete removal of tension from a belt drive to perform maintenance, instead this prior art is directed towards maintaining an ideal system tension. Further shortcomings include no mention of removing tension by compressing a tensioner spring and being able to reapply tension afterwards. There is also a lack of adaptability, where this device is itself the tensioner and cannot be used alongside another inline tensioner.

U.S. Pat. No. 5,277,666 A (Kumm) discloses a belt tensioner of the type which automatically maintains a relatively constant desired tension on a serpentine accessory power transmission belt or drive belt. Shortcomings include a lack of adaptability, where this device is itself the tensioner, and cannot be used alongside another inline tensioner. Further shortcomings include the describe tensioner being a rotary tensioner, rather than an inline tensioner. Further, there is a lack of discussion regarding the complete removal of tension from a belt drive to perform maintenance, while still being able to reapply tension afterwards, instead this prior art is directed towards maintaining an ideal system tension.

U.S. Pat. No. 4,557,709 A (St. John) discloses a belt tensioner for constantly, automatically maintaining substantially constant tension in the endless belt of a serpentine belt drive system. Shortcomings include a lack of adaptability, where this device is itself the tensioner, and cannot be used alongside another inline tensioner. Further shortcomings include the describe tensioner being a rotary tensioner, rather than an inline tensioner. Further, there is a lack of discussion regarding the complete removal of tension from a belt drive to perform maintenance, while still being able to reapply tension afterwards, instead this prior art is directed towards maintaining an ideal system tension.

U.S. Pat. No. 3,641,830 A (Stofer) discloses a safety release mechanism for a spring-loaded tensioner of a belt or chain drive. Shortcomings include a lack of discussion regarding the complete removal of tension from a belt drive to perform maintenance, while still being able to reapply tension afterwards.

Further, many existing tools, including but not limited to the prior art above, lack in safety features and may still be dangerous to a mechanic, for example, who may need to work on serpentine belts frequently.

All documents cited herein are incorporated by reference.

It is clear that there exists a need for a compressor tool for inline spring-loaded serpentine belt tensioners used in motive power systems that can be adaptable for use alongside an inline spring-loaded serpentine belt tensioner. There is a need for a tool that allows for tension to be removed from a belt drive to perform maintenance by safely compressing the tensioner spring, while still being able to reapply tension afterwards, without needing to replace the inline spring-loaded tensioner, or cut the belt.

Applicant proposes a tool for compressing an inline spring-loaded serpentine belt tensioner that overcomes disadvantages inherent in the existing tensioner compression tools, such as, but not limited to, a lack of adaptability to be used alongside inline spring-loaded serpentine belt tensioners, an inability to reuse the same tensioner after performing maintenance on a belt system, a lack of maintenance and repair options other than cutting the belt and replacing the tensioner, an inability to remove and reapply tension easily to a serpentine belt with an inline tensioner, a lack of safe use, among others. The present invention provides a compressing tool that may be affixed to an inline spring-loaded serpentine belt tensioner used in motive power systems, allowing a user to safely compress the tensioner and tensioner spring, such that belt tension may be relieved, maintenance may be performed, and allowing the tensioner spring to extend afterwards reapplying tension to the system all without needing to replace the inline spring-loaded tensioner or cut the belt, among other benefits. As such, the general purpose of the present invention, which will be described subsequently in greater detail, is to provide a new and improved tool for compressing inline spring-loaded serpentine belt tensioners, which provides the advantages and overcomes the aforementioned disadvantages.

BRIEF SUMMARY

It is an object of the invention to provide a serpentine belt tensioner compressor tool.

In accordance with an aspect of the invention there is provided a tool for compressing an inline spring-loaded serpentine belt tensioner used in motive power systems, comprising a frame affixed with a fastening pin, the fastening pin optionally inserted into a hollow axle of the inline spring-loaded serpentine belt tensioner. A threaded stud affixed to an end of the frame, the threaded stud optionally coupled to a yoke providing lateral movement of the yoke along the threaded stud. A threaded fastener optionally coupled to the threaded stud and the yoke restricting movement of the yoke, the yoke optionally coupled to an end of the inline spring-loaded serpentine belt tensioner opposite the fastening pin. A lip attached to the yoke, the lip grasping the end of the inline spring-loaded serpentine belt tensioner, movement of the yoke along the threaded stud controls extension and contraction of the inline spring-loaded serpentine belt tensioner.

Wherein tightening the threaded fastener, causing the yoke to move along the threaded stud in a first direction, compresses the inline spring-loaded serpentine belt tensioner and loosening the threaded fastener, causing the yoke to move along the threaded stud in a second direction, expands the inline spring-loaded serpentine belt tensioner.

In accordance with another aspect of the invention there is provided the tool, as described above, wherein the lip is adjustable.

In accordance with an additional aspect of the invention there is provided the tool, as described above, wherein a washer is coupled to the threaded stud, the washer being attached in between the threaded fastener and the yoke.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
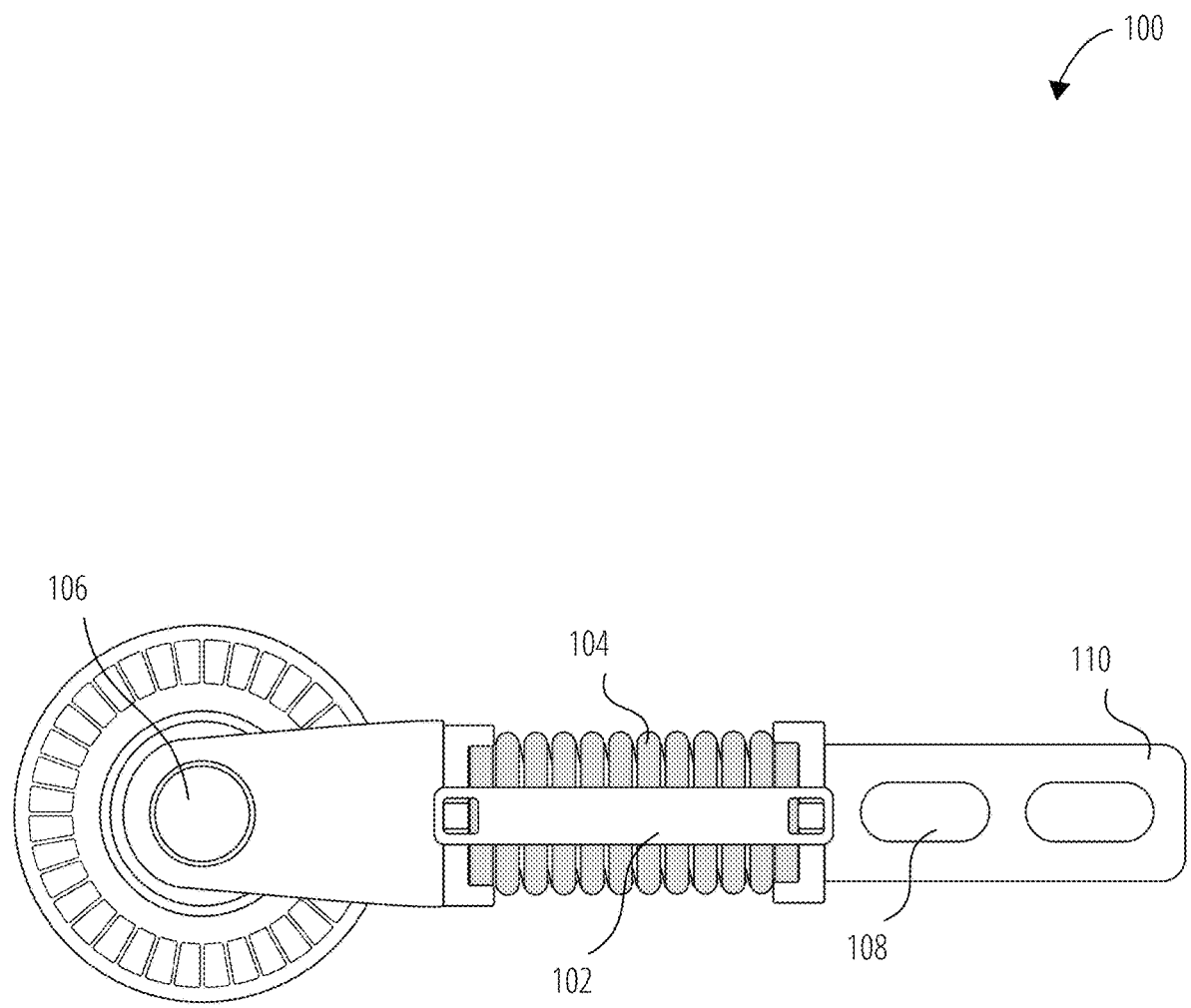

Embodiments will now be described, by way of example only, with reference to the attached figures, wherein the figures:

FIG. 1 illustrates a side view of an example inline spring-loaded serpentine belt tensioner, according to some embodiments.

Figure 2A:
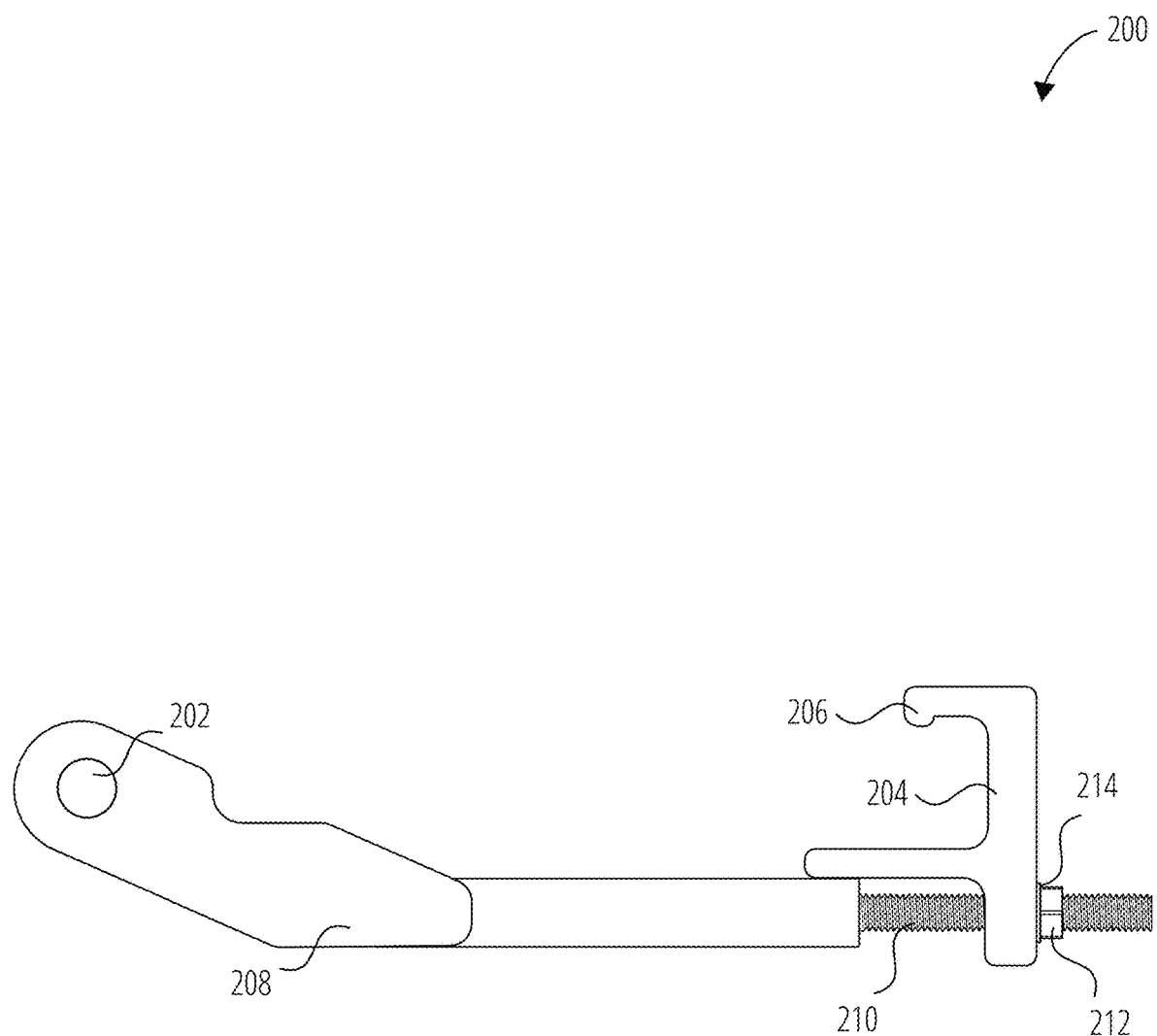

FIG. 2A illustrates a side view of an example tool, according to some embodiments.

Figure 2B:
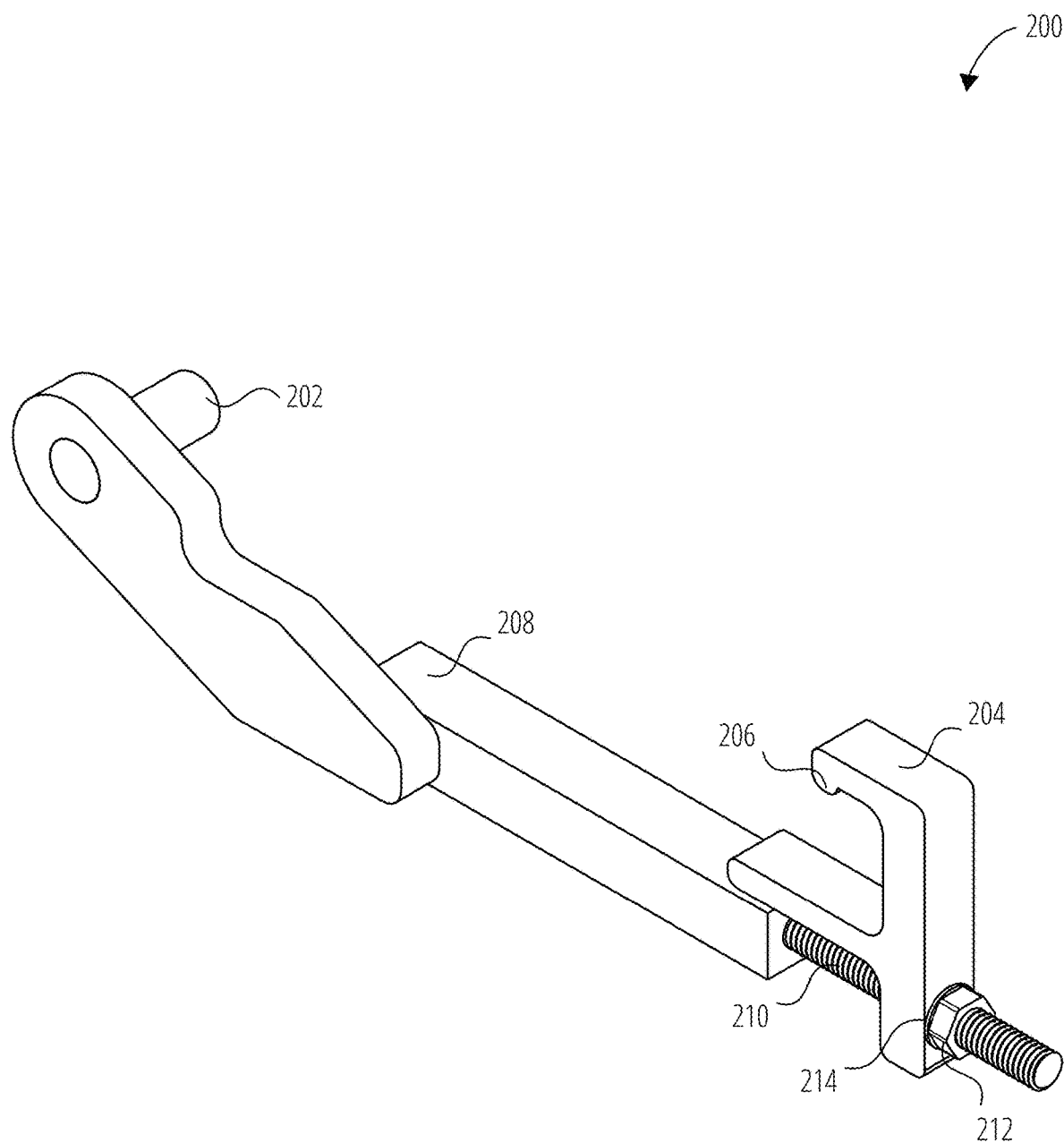

FIG. 2B illustrates a perspective view of an example tool, according to some embodiments.

Figure 3:
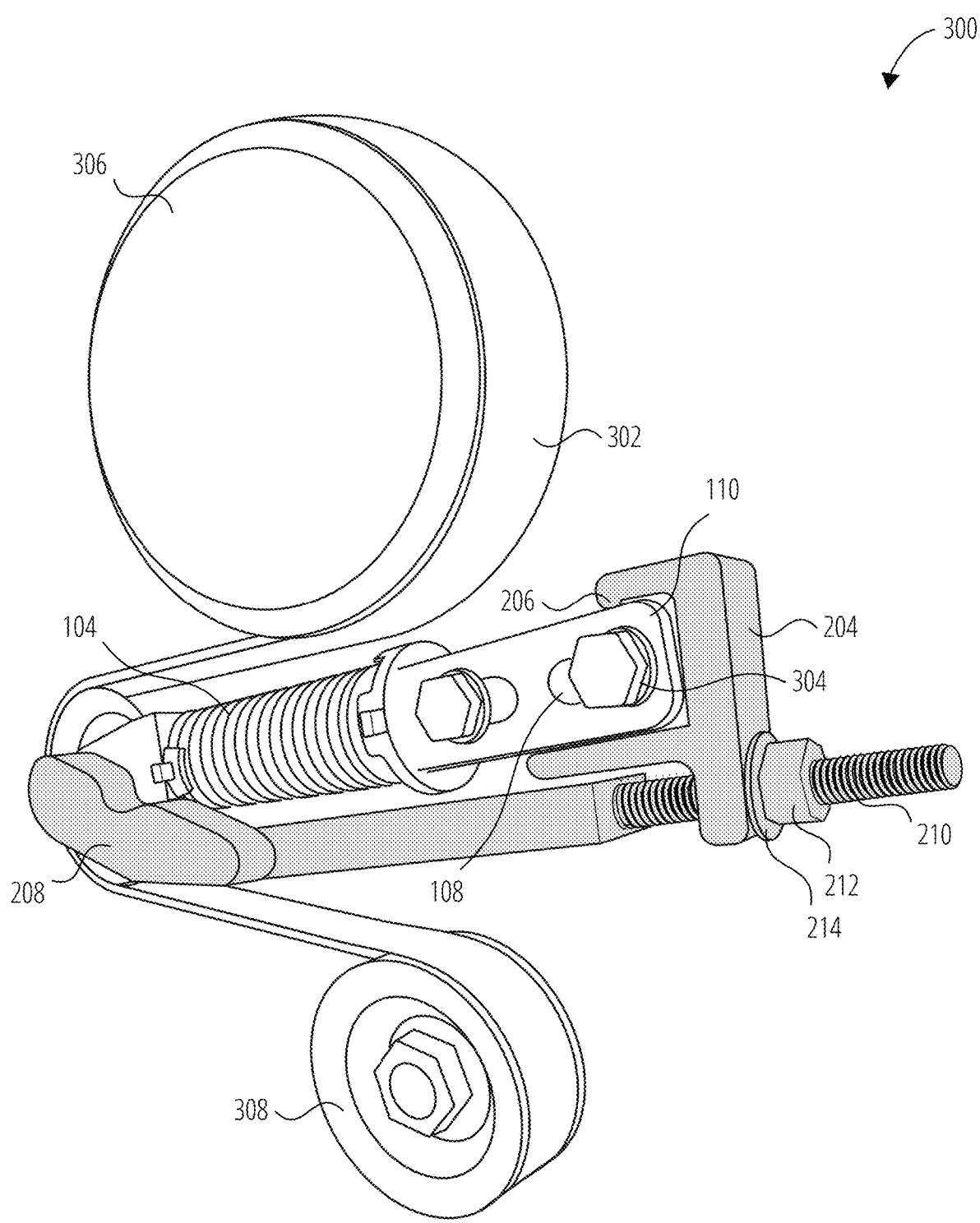

FIG. 3 illustrates a perspective view of an engaged example tool compressing an inline spring-loaded serpentine belt tensioner, according to some embodiments.

Figure 4:
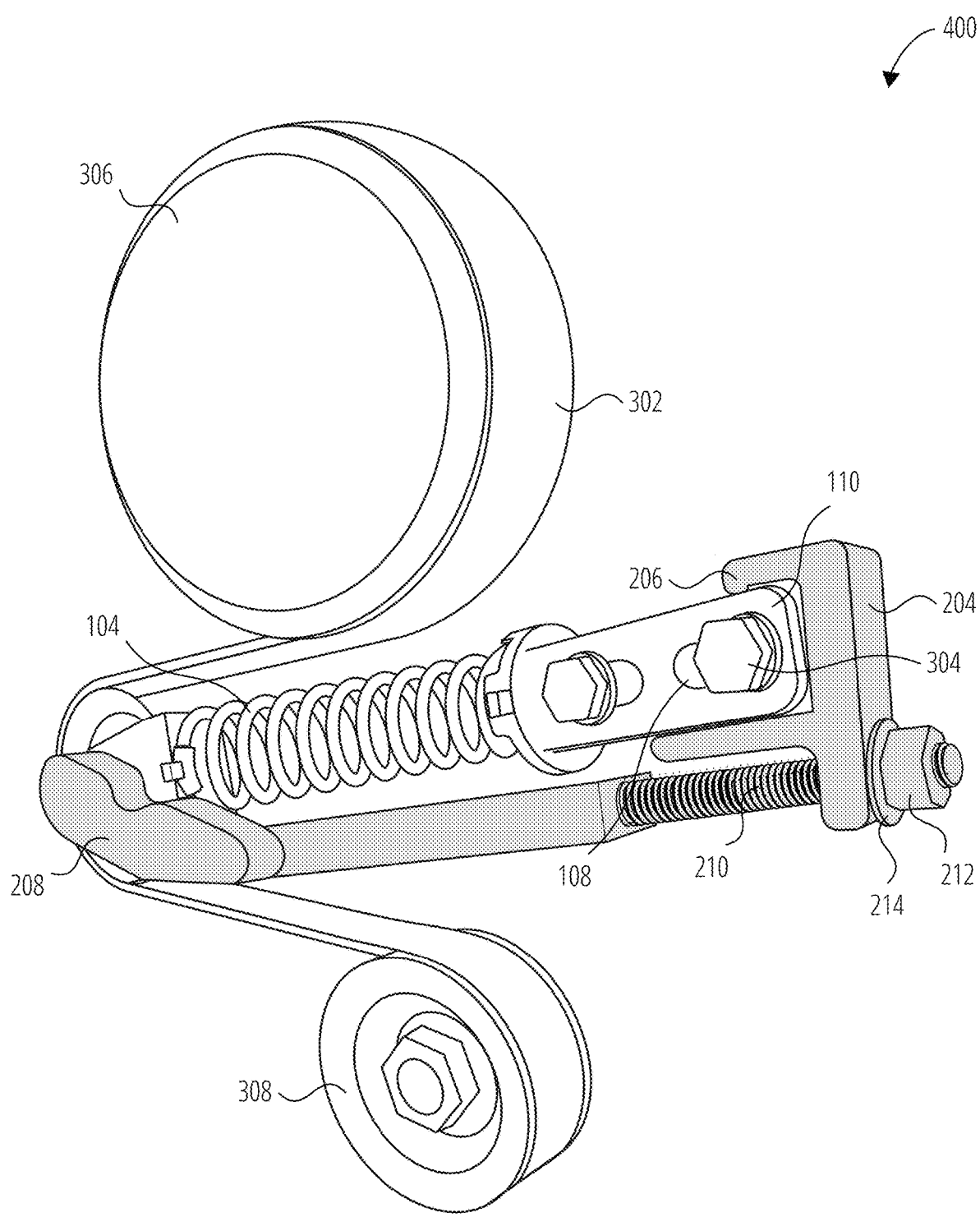

FIG. 4 illustrates a perspective view of a disengaged example tool allowing extension of an inline spring-loaded serpentine belt tensioner, according to some embodiments.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The present invention describes a tool for compressing an inline spring-loaded serpentine belt tensioner used in motive power system, that overcomes disadvantages inherent in the known methods and systems of tensioner compression for belt drives. The present invention provides a compressing tool that may be affixed to an inline spring-loaded serpentine belt tensioner used in motive power systems, allowing a user to safely compress the tensioner and tensioner spring, such that belt tension may be relieved, maintenance may be performed, and allowing the tensioner spring to extend afterwards reapplying tension to the system all without needing to replace the inline spring-loaded tensioner or cut the belt, among other benefits. As such, the general purpose of the present invention, which will be described subsequently in greater detail, is to provide a new and improved tool for compressing an inline spring-loaded serpentine belt tensioner which has all the advantages of the existing compression tools and none of the disadvantages.

A tool for compressing an inline spring-loaded serpentine belt tensioner used in motive power systems is presented herein. The tool comprises a frame affixed with a fastening pin, such that the fastening pin may be inserted into a hollow axle of said inline spring-loaded serpentine belt tensioner. The tool further comprises a threaded stud affixed to an end of said frame, the threaded stud optionally coupled to a yoke providing lateral movement of the yoke along the threaded stud. A threaded fastener is optionally coupled to the threaded stud and the yoke restricting movement of the yoke, the yoke optionally coupled to an end of the inline spring-loaded serpentine belt tensioner opposite the fastening pin. The tool further comprises a lip attached to said yoke, the lip grasping the end of the inline spring-loaded serpentine belt tensioner, movement of the yoke along the threaded stud controls extension and contraction of the spring-loaded serpentine belt tensioner.

Wherein tightening the threaded fastener, causing the yoke to move along the threaded stud in a first direction, compresses the inline spring-loaded serpentine belt tensioner, and loosening the threaded fastener, causing the yoke to move along the threaded stud in a second direction, expands the inline spring-loaded serpentine belt tensioner.

FIG. 1 illustrates a side view of an example inline spring-loaded serpentine belt tensioner 100, according to some embodiments. Typically, prior to first assembly of a belt to a tensioner, a retaining strap 102 may be used to keep the inline spring-loaded serpentine belt tensioner 100, in particular utilizing a spring 104 under tension.

Currently there exists no tool on the market to compress such a serpentine belt tensioner. Typically, a person who may wish to perform work on this system is typically required to cut the belt and replace the tensioner each time, or to perform dangerous repair techniques with no guarantee for success.

The common method for replacement of an inline spring-loaded serpentine belt tensioner 100 is to cut a belt for which the tensioner is providing tension, which can be hazardous for a person, such as a mechanic, repairing the tensioner. In addition, currently whenever maintenance must be performed on a motive power system, the tensioner must be replaced each time. The alternative would require dangerous repair techniques to be used, with no guarantee for success. This is in part, due to the fact that there exists no tool currently on the market to compress such an inline spring-loaded serpentine belt tensioner 100.

Inline spring-loaded serpentine belt tensioners 100 are integral components for accessory drive systems, as opposed to rotary tensioners. This application describes below, a tool which may, in some embodiments, allow a belt to be serviced and/or replaced, as well as an inline spring-loaded serpentine belt tensioner 100 to be serviced for any maintenance or repairs.

In some embodiments, an inline spring-loaded serpentine belt tensioner 100 may include a hollow axle 106. Some embodiments may include screw holes 108, which may allow for the inline spring-loaded serpentine belt tensioner 100 to be fastened to an accessory drive system, for example. In some embodiments, the inline spring-loaded serpentine belt tensioner 100 may have an end 110.

FIG. 2A illustrates a side view of an example tool 200, according to some embodiments. The tool 200 may, in some embodiments, allow a person to relieve belt tension, provided by an inline tensioner, such as an inline spring-loaded serpentine belt tensioner 100, from an accessory drive system. This may allow said person to perform maintenance on the system without cutting the belt. This may also allow said person to save both the belt and tensioner for reuse.

In some embodiments, the tool 200 may save a customer the cost of a belt and tension, unless the belt or tensioner are the issue. The tool 200 may also allow a person to inspect the accessory drive system, free of applied tension from a tensioner, without having to unnecessary replace parts, such as the tensioner and belt. In some embodiments, the tool 200 may make it safer to remove and replace worn parts by caging the tensioner spring 104 such that a belt may be removed without cutting.

In some embodiments, the tool 200 may be placed over a part to be compressed, such as inline spring-loaded serpentine belt tensioner 100, by inserting a fastening pin 202 into a hollow axle 106 of such a tensioner, for example. In some embodiments, the yoke 204 may be placed over the end 110 of a tensioner, with the lip 206 helping to maintain a firm grasp of the end 110 of the tensioner by the mounted slots, such that the yoke 204 stays in the correct position. In some embodiments, the tool 200 may have a frame 208, onto which the fastening pin 202 and the threaded stud 210 may be affixed.

By tightening the threaded fastener 212 on the threaded stud 210, in some embodiments, a person may be able to compress a tensioner's spring 104, for example. This is effectively making said tensioner shorter, thus relieving belt tension. In some embodiments, a washer 214 may be placed between the yoke 204 and the threaded fastener 212, such that the washer 214 may distribute the load of the threaded fastener 212, among other benefits.

In some embodiments, the lip 206 may be adjustable. For example, in some embodiments, the lip 206 may be an adjustable screw, allowing a user to ensure an appropriate fit of the end 110 within the yoke 204.

FIG. 2B illustrates a perspective view of an example tool 200, according to some embodiments. This figure may provide a better view of the fastening pin 202, which may in some embodiments, extend from the frame 208 of the tool 200.

The threaded stud 210 may be attached to the frame 208, with the yoke 204, the threaded fastener 212, and the washer 214 being affixed to the threaded stud 210, in some embodiments. The lip 206, in some embodiments, may provide support to the yoke 204, such that the yoke 204 may remain in about the correct position and that the yoke 204 may maintain a firm grasp on an end of a tensioner device, such as the end 110 presented in FIG. 1.

FIG. 3 illustrates a perspective view 300 of an engaged example tool compressing an inline spring-loaded serpentine belt tensioner, according to some embodiments.

In some embodiments, the tool 200 may be used in an accessory drive system having a belt 302, an air compressor 306, an alternator 308 and a tension that is applied by an inline spring-loaded serpentine belt tensioner 100. Here, the tool 200 may be engaged, such that the accessory drive system is relieved of tension, which may have been provided by inline spring-loaded serpentine belt tensioner 100.

As a non-limiting example, a mechanic may wish to perform maintenance on a part of an accessory drive system. Instead of the traditional method of cutting belt 302 and removing and replacing inline spring-loaded serpentine belt tensioner 100, the system may be fitted with the tool 200. Using a wrench, or another device, said mechanic may, in some embodiments, tighten the threaded fastener 212, moving it, the washer 214, and subsequently the yoke 204 inwards along the threaded stud 210, towards the frame 208. As the yoke 204 moves inwards, the spring 104 may begin to compress because the yoke 204 and the lip 206 may be grasping the end 110 of the tensioner, moving the end 110 inwards as well. In some embodiments, screw holes 108 may have bolts 304 to affix the inline spring-loaded serpentine belt tensioner 100 to the accessory drive system. Using the tool 200 to compress the spring 104 may allow said mechanic to perform maintenance on a part of the accessory drive system, without needing to cut the belt 302 and replace the inline spring-loaded serpentine belt tensioner 100 entirely.

In some embodiments, the tool 200 may allow tension to be re-applied to an accessory drive system. For example, a mechanic may compress the inline spring-loaded serpentine belt tensioner 100 to work on the belt 302, and once finished, may use the tool 200 to reapply tension across the system.

FIG. 4 illustrates a perspective view 400 of a disengaged example tool allowing extension of an inline spring-loaded serpentine belt tensioner, according to some embodiments.

In some embodiments, the tool 200 may be used in an accessory drive system having a belt 302, an air compressor 306, an alternator 308 and a tension that is applied by an inline spring-loaded serpentine belt tensioner 100. Here, the tool 200 may be disengaged, such that tension is applied to the accessory drive system, which may be provided by the inline spring-loaded serpentine belt tensioner 100.

In some embodiments, the tool 200 may allow tension to be re-applied to the accessory drive system. For example, a mechanic may compress the inline spring-loaded serpentine belt tensioner 100 to work on the belt 302, and once finished, may use the tool 200 to reapply tension across the system by disengaging the tool 200.

As a non-limiting example, a mechanic may have completed maintenance on a part of an accessory drive system. Instead of the traditional method of cutting the belt 302 and removing and replacing the inline spring-loaded serpentine belt tensioner 100, the system may be fitted with the tool 200 and the inline spring-loaded serpentine belt tensioner 100 may be reused. Using a wrench, or another device, said mechanic may, in some embodiments, loosen the threaded fastener 212, moving it, the washer 214, and subsequently the yoke 204 outwards along the threaded stud 210, away from the frame 208. As the yoke 204 moves outwards, the spring 104 may begin to extend, reapplying tension, because the spring 104 has a natural tendency to expand, as well as the yoke 204 and the lip 206 may be grasping the end 110 of the tensioner, moving the end 110 outwards as well. In some embodiments, screw holes 108 may have bolts 304 to affix the inline spring-loaded serpentine belt tensioner 100 to the accessory drive system. Using the tool 200 to reapply tension to the spring 104 may allow said mechanic to perform maintenance on a part of the accessory drive system, without needing to cut the belt 302 and replace the inline spring-loaded serpentine belt tensioner 100 entirely.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A tool for compressing an inline spring-loaded serpentine belt tensioner used in motive power systems, comprising:
    a frame affixed with a fastening pin, said fastening pin optionally inserted into a hollow axle of said inline spring-loaded serpentine belt tensioner;
    a threaded stud affixed to an end of said frame, said threaded stud optionally coupled to a yoke providing lateral movement of said yoke along said threaded stud, a threaded fastener optionally coupled to said threaded stud and said yoke restricting movement of said yoke, said yoke optionally coupled to an end of said inline spring-loaded serpentine belt tensioner opposite said fastening pin;
    a lip attached to said yoke, said lip grasping said end of said inline spring-loaded serpentine belt tensioner, movement of said yoke along said threaded stud controls extension and contraction of said inline spring-loaded serpentine belt tensioner;
    wherein tightening said threaded fastener, causing said yoke to move along said threaded stud in a first direction, compresses said inline spring-loaded serpentine belt tensioner and loosening said threaded fastener, causing said yoke to move along said threaded stud in a second direction, expands said inline spring-loaded serpentine belt tensioner.

2. The tool of claim 1, wherein said lip is adjustable.

3. The tool of claim 1, wherein a washer is coupled to said threaded stud, said washer being attached in between said threaded fastener and said yoke.

* * * * *